J. T. DEMPSTER.
VIBRATING RECTIFIER.
APPLICATION FILED SEPT. 17, 1908.
1,019,608.
Patented Mar. 5, 1912.
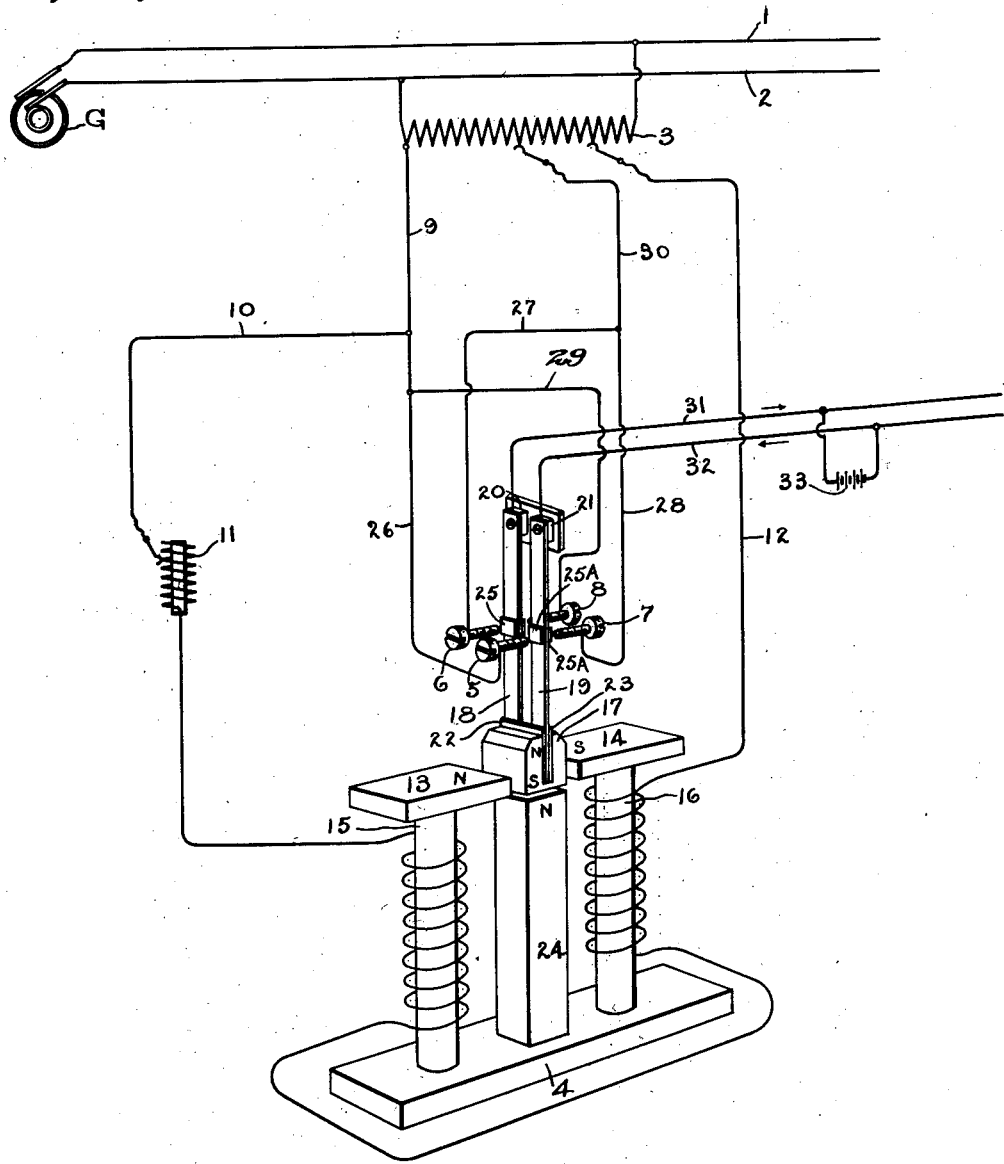
WITNESSES:
Lester H. Fulmer
J. Ellis Glen
INVENTOR
JOHN T. DEMPSTER.
BY
Albert H. Davis
ATT'Y.

UNITED STATES PATENT OFFICE.

JOHN THOS. DEMPSTER, OF SCHENECTADY, NEW YORK, ASSIGNOR TO GENERAL ELECTRIC COMPANY, A CORPORATION OF NEW YORK.

VIBRATING RECTIFIER.

1,019,608.   Specification of Letters Patent.   Patented Mar. 5, 1912.

Application filed September 17, 1908. Serial No. 453,412.

*To all whom it may concern:*

Be it known that I, JOHN T. DEMPSTER, a subject of the King of Great Britain, residing at Schenectady, county of Schenectady, State of New York, have invented certain new and useful Improvements in Vibrating Rectifiers, of which the following is a specification.

My invention relates to apparatus for converting alternating current into direct current.

The invention comprises a device containing a "vibrator" carrying a set of contacts movable in synchronism with the periodicity of the alternating current and operative to shaft the connections in such a way as to yield direct current suitable for use in an external or load circuit.

The accompanying drawing illustrates one embodiment of my invention. It shows a somewhat diagrammatic perspective view of my device, and a diagram of the connections therefor.

The novel features of my invention are pointed out in the accompanying claims.

Lines 1, 2 carry an alternating current, supplied by the generator G. Connected across the alternating current mains is the compensator 3. Before taking up the various connections of my device to the compensator, it is pointed out, for the sake of clearness, that there are two sets of connections, one set connecting with an alternating current magnet 4 and another set connecting with two pairs of stationary contacts 5, 6 and 7, 8, the purpose of which will be hereinafter explained. The U-shaped magnet 4 is connected to one side of the compensator by means of conductors 9 and 10, the latter having included in its circuit an adjustable reactance coil 11, the purpose of which will later appear. The magnet is connected to the other side of the compensator by means of conductor 12, which has been shown as making adjustable contact with the compensator, so as to permit regulation of the voltage impressed on the magnet 4. Pole pieces 13, 14 are mounted respectively on each end of the poles 15, 16 of the magnet, thus constituting with the rest of the magnet a substantially closed magnetic circuit with an air gap between the pole pieces. Armature 17, adapted to vibrate between the oppositely disposed, free pole pieces 13, 14, is mounted on two resilient springs, or tongues, 18, 19, which are attached at fixed points on support 20, 21 thus constituting a freely vibrating magnetic reed. The springs 18, 19 are insulated from the armature 17 by means of insulators, such as mica plates 22 and 23. The armature 17 and springs 18 and 19 which together we may call the "vibrator," are so proportioned that the natural period of vibration will be approximately the same as that of the frequency of the alternating current in mains 1, 2. This may be done by varying the length or stiffness of the springs 18, 19 or the weight of the armature 17. The importance of this feature has not heretofore been recognized in connection with devices of the general type here illustrated. A permanent magnet 24 is mounted between the poles of the alternating current magnet and adjacent to the air gap, as indicated, and serves to induce a magnetic pole at opposite ends of the armature 17. For example, if the end of the magnet 24, which is nearest the armature 17, is a north pole, a south pole will be induced in the end of the armature 17 which is nearest the permanent magnet and a north pole at the opposite end, as indicated in the drawing. Two sets of contacts 25, 25$^A$ are mounted on each side of the springs 18 and 19 and are electrically connected with the springs. The stationary contacts 5, 6, 7 and 8 coöperate with the contacts 25 and 25$^A$ and are connected respectively to the conductors 26, 27; the stationary contacts 7 and 8 also, coöperating with the contacts 25, 25$^A$, are connected respectively to conductors 28, 29. The conductor 30 connecting lines 27 and 28 to the compensator is made adjustable so as to permit a variation of impressed voltage. The ends of the springs 18, 19 are electrically connected with lines 31 and 32 which serve to carry the rectified current.

Having now described the parts and connections of my device, I will proceed to explain its manner of operation.

When the circuit is completed through the alternating current magnet 4, the ends of the pole pieces 13, 14 will be alternately made north and south poles. As the armature 17 is permanently polarized, it will be directed first toward one side and then toward the other in synchronism with the alternations of the current in the magnet 4. Suppose it is directed toward the pole piece 13; the contacts 5, 6 will then touch the contacts 25, 25^A mounted on the vibrator and we may assume that the current will flow from conductors 30 and 27 to the contact 6, to contact 25 and from thence out to the direct current line 31 returning over the line 32 as indicated by the arrows, to contact 5, and conductor 26. When the current in the magnet 4 reverses the armature 17 will be moved to the opposite pole, 14, and the contacts on the opposite side of the springs 18, 19 will now touch the stationary contacts 7, 8. The alternating current which has reversed will flow from conductors 9 and 29 to the stationary contact 8, to the contact 25 on the opposite side of the spring 18 and in the same direction on the other line 31, returning over line 32, to contact 7 and lines 28 and 30. This cycle will be rapidly repeated and in this manner and direct current will flow in the lines 31 and 32, where it may serve to charge a storage battery 33 or be used in any desired manner.

As the armature 17 and in fact the vibrator as a whole has a certain inertia, and therefore requires a definite interval of time in order to change its position, it is important that the reversal of current in the alternating current magnet 4 should occur in advance of the reversal of the current in the rest of the system. In this manner the reversal of the polarity of the magnet 4 will occur in advance of the reversal of the current in conductors 9 and 30 and thereby cause the vibrator to make and break the circuit near the zero point of the alternating current wave. I find that this requires a displacement of phase of about ninety electrical degrees. This displacement may be given to the current by including either a condenser or a reactance coil in either circuit as it does not matter whether the current in one of the two circuits is advanced or retarded so long as the phase displacement is about ninety degrees. However, I prefer to use a reactance coil as this can be easily made adjustable. The adjustability is an important feature as under certain conditions, as will be later pointed out, it is important to break the connections before the alternating current wave reaches the zero point. It is also important that the moving contacts making connection between the direct current lines and the alternating current lines ordinarily should be at open circuit a minimum interval of time. For this reason these contacts are situated in an intermediate position between the fixed points of supports 20 and 21 and the freely vibrating end represented by the armature 17. As the springs 18 and 19 are flexible, most of the movement will take place in the portion of the spring between the points of electrical contact and the oscillating armature 17. When the armature 17 is moved toward the pole pieces 13, so as to make contact at 5 and 6 it can move an appreciable distance toward the pole 14 before the contact at 5 and 6 is broken and after these contacts are broken, only a very short interval of time need elapse before contact is again made at 7 and 8. When the device is to be used to rectify a current for charging a storage battery, it is so designed with respect to the position of the moving contacts, and the amount of effective reactance in circuit, that the lines 31, 32 are open circuited during the time interval when the storage battery voltage equals or exceeds the line voltage, thus avoiding any discharge of the battery through the instrument. In this case, the phase relation of the current energizing the magnet 4, and the current in conductors 26, 27, 28 and 29 is so regulated by adjusting the reactance 11, that the contact with 5, 6 and 7, 8 will be broken, not when the alternating current has become zero, but when its voltage has fallen to the value of the battery voltage. The contact parts are so adjusted that contact is not reëstablished until the voltage of the alternating current again equals the battery voltage.

What I claim as new and desire to secure by Letters Patent of the United States, is,

1. In a rectifier, the combination of a magnet having a substantially closed magnetic circuit and having opposing pole pieces with an intervening air gap, means for causing an alternating magnetic flux in said magnet, a magnetic member free to vibrate in the air gap, magnetic means having a pole adjacent to said member and said gap for exerting upon the said member a magnetizing effect of constant polarity and coöperating switching contacts actuated by the vibration of said member for delivering alternating impulses of current as a succession of unidirectional impulses.

2. In a mechanical rectifier, the combination of a magnet having a substantially closed magnetic circuit and having opposing poles with an intervening air gap, means for causing an alternating flux in said magnet, a resilient magnetic reed adapted to freely vibrate between the poles of said magnet in the air gap, a fixed support therefor, magnetic means adjacent to said member and said gap furnishing a unidirectional magnetizing flux and coöperating switching contacts actuated by the vibration of said member for delivering alternating impulses of current as a succession of unidirectional impulses.

3. In a vibrating rectifier, the combination of a magnet energized by alternating current and having free poles oppositely disposed with an intervening air gap, an armature free to vibrate in said gap, a resilient tongue support for said armature on one side of the gap, a magnetic member of constant polarity in operative relation with said armature on the other side of the gap for exerting upon said armature a magnetizing flux in the direction of its length and means actuated by the vibration of said armature for delivering impulses of alternating current as rectified current.

4. In a mechanical rectifier, the combination of a U-shaped magnet having oppositely disposed poles with an intervening air gap, means for causing an alternating flux in said magnet, an armature of substantially the dimensions of said gap free to vibrate longitudinally between the poles of said magnet, a control magnet of constant polarity mounted between the legs of the alternating current magnet and having a pole adjacent to the armature for impressing thereupon a magnetizing flux in the direction of its length, and means actuated by the vibration of said armature for delivering impulses of alternating current as a succession of unidirectional impulses.

5. The combination of an alternating current source, an electromagnet having oppositely disposed poles with an air gap but having an otherwise substantially closed magnetic circuit, means for exciting said magnet with an alternating flux in step with the vibrations of the current from said source but displaced in phase therewith, a vibrator comprising an armature free to vibrate between said poles, resilient tongue supports for said armature insulated from one another, a magnet of constant polarity opposite said vibrator and adjacent to said gap, exerting an inductive effect upon said armature, stationary contacts, and contacts mounted on said supports and operating in conjunction with said fixed contacts by the vibrations of said armature to rectify the alternating current.

6. In a mechanical rectifier, the combination of a magnet having oppositely disposed poles with an intervening air gap, a source of alternating current, means for magnetizing said magnet with an alternating flux in step with the vibrations of current from said source, an armature free to vibrate in the air gap, a resilient tongue carrying the armature, a fixed support for one end of the tongue; the vibrating element being proportioned to have a natural period of vibration approximating that of said source, a magnet of constant polarity adjacent to said gap and said armature, exerting an inductive effect upon said armature, and means actuated by the vibrations of said armature for delivering impulses of current from said source as unidirectional impulses.

7. In a mechanical rectifier, the combination of an electromagnet having a magnetic circuit substantially closed except for an air gap, a source of alternating current, means for magnetizing said magnet with a flux alternating in step with the vibrations of current from said source, an armature of constant polarity of substantially the dimensions of said gap arranged to vibrate therein, a resilient reed support therefor, the armature and reed having a natural period of vibration approximating that of said source, a fixed support for the opposite end of said reed and means actuated by the vibrations of said armature for delivering impulses of current from said source as unidirectional impulses.

In witness whereof, I have hereunto set my hand this 15th day of September, 1908.

JOHN THOS. DEMPSTER.

Witnesses:
 BENJAMIN B. HULL,
 MARGARET E. WOOLLEY.